United States Patent [19]

Robert et al.

[11] Patent Number: 4,728,748

[45] Date of Patent: Mar. 1, 1988

[54] LIGHTNING CONDUCTOR WITH PIEZOELECTRIC DEVICE FOR STARTING THE CORONA EFFECT

[75] Inventors: André Robert, Le Mesnil Saint Denis; Michel Roubinet, Paris; Jacques Baumann, Boutigny sur Essonne, all of France

[73] Assignee: Commissariat a l'Energie Atomique, Paris, France

[21] Appl. No.: 37,712

[22] Filed: Apr. 13, 1987

[30] Foreign Application Priority Data

Apr. 11, 1986 [FR] France ................. 86 05214

[51] Int. Cl.⁴ .......................................... H02G 13/00
[52] U.S. Cl. .................................. 174/3; 174/4 R
[58] Field of Search .............. 174/2, 3, 4 R; 361/117

[56] References Cited

U.S. PATENT DOCUMENTS 4,518,816  5/1985  Robert ......................... 174/3

FOREIGN PATENT DOCUMENTS 0123578 10/1984 European Pat. Off. .
1089440  9/1960 Fed. Rep. of Germany ..... 174/4 R
2170211  9/1973 France .
2106330  4/1983 United Kingdom .

Primary Examiner—Laramie E. Askin
Attorney, Agent, or Firm—Cesari and McKenna

[57] ABSTRACT

Lightning conductor with a piezoelectric device for starting the corona effect. A lightning conductor pole rests on a support fixed by means of a ball. Under the action of the wind, the pole moves out of the vertical position until a shoulder abuts against a flange of the support. With the wind continuing to act on the pole, the latter exerts a considerable force on the support and the reaction force or torque is transmitted to the piezoelectric device by means of the ball.

14 Claims, 7 Drawing Figures

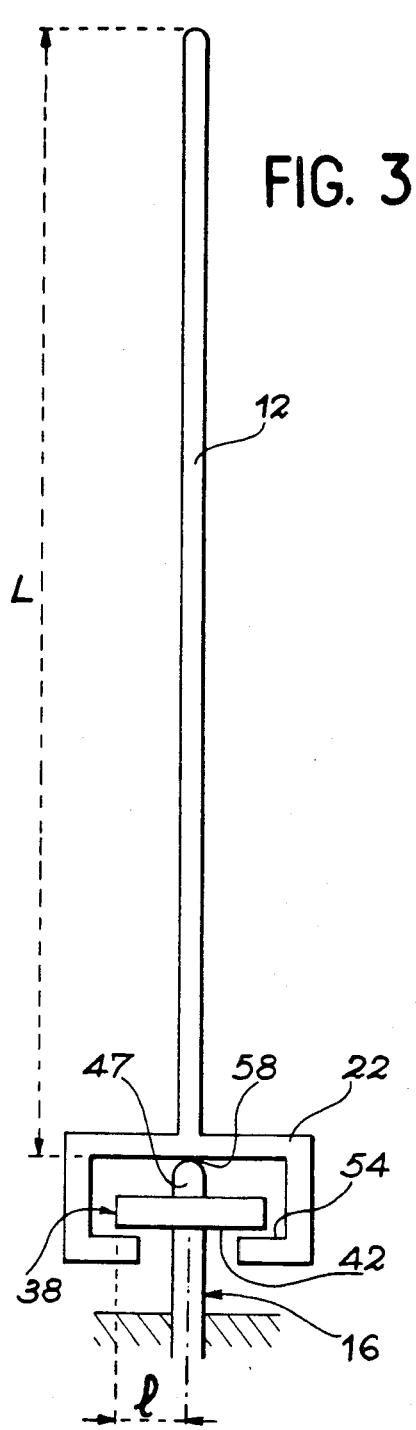
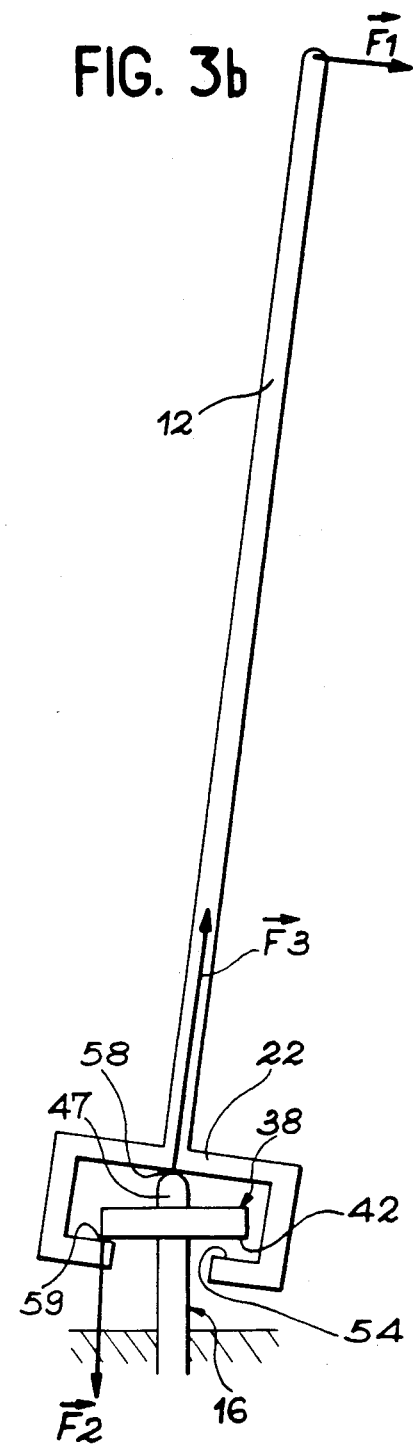

LIGHTNING CONDUCTOR WITH PIEZOELECTRIC DEVICE FOR STARTING THE CORONA EFFECT

BACKGROUND OF THE INVENTION

The present invention relates to lightning conductors and more specifically to lightning conductors having a piezoelectric device for starting or initiating the corona effect.

During thunderstorms, the lightning current is formed in two stages. In a first stage, a current called a "downward tracer" constituted by charged particles generally in the form of electrons is directed towards the ground. The genera direction of its movement is linked with the local electric field. At the approach of said tracer, objects on the ground are exposed to an intense electric field which, at the most favourable points, gives rise to the appearance of upward discharges, which are called "upward tracers". When an upward tracer encounters a downward tracer, this has the effect of closing an electric circuit in which the lightning current flows. The latter then falls at the point able to bring about the fastest emission of the upward tracer.

As intense electric fields preferably form in the vicinity of pointed metal objects, lightning conductors are generally constituted by a vertical rod terminated by a metal point called the "intercepting point", said rod being electrically connected to the ground. Thus, on the approach of the downward tracer, the point of the lighting conductor produces an electric field with an intensity higher than the adjacent electric field. It is therefore the preferred location for the formation of the upward tracer. The effectiveness of the lightning conductor, i.e. the extent of the protected area, increases in proportion to the emission of the upward tracer from the point being preferred compared with the emission of an upward tracer from another location.

The upward tracer results from the appearance of the corona effect consisting of an intense emission of electrons from the point or tip of the lighting conductor under the influence of an intense electric field. However, this electron emission takes place with a certain time lag (a few dozen microseconds) after the electric field has reached the value necessary for initiating the corona effect. This lag can be reduced by increasing the population of free electrons in the vicinity of the point, so that the corona effect can be formed on the basis of an electron called a "germ electron" located in the vicinity of the point. This permits the earlier formation of an upward tracer, which will meet the downward tracer at a higher altitude, so that the area protected by the lightning conductor is increased.

EP-A1-0 123 578 describes a lightning conductor in which the population of free electrons in the vicinity of the point is increased as a result of an electrode positioned in the vicinity of the point and a piezoelectric crystal which can be compressed in different ways. In order to compress the crystal, it is possible to use a flexible member moved under the action of the wind and which has a boss bearing on the crystal. It is also possible to use a turbine moved under the action of wind and which has several bosses which, during the rotation thereof, bear on one or more piezoelectric crystals, each of which is connected to an electrode. It is also possible to use an electromagnet for exerting a pressure on the piezoelectric crystal.

Although such a device makes it possible to effectively increase the population of free electrons in the vicinity of the lightning conductor point, it still suffers from certain disadvantages. Firstly, it requires high winds in the case where the compression of the crystal is obtained either by a metal plate having a boss, or by a turbine and such devices no longer operate when there is no wind or when the wind is light. Moreover, in the version using electromagnets, it is necessary to use an external power supply and the device no longer functions if the latter breaks down.

SUMMARY OF THE INVENTION

The object of the present invention is to obviate these disadvantages by proposing a lightning conductor with piezoelectric initiation of the corona effect and which functions even in the case of very light winds and which does not have to call on external means.

In known manner, the lightning conductor according to the invention comprises a substantially vertical pole or rod, an intercepting point located in the upper part of the pole and electrically connected with the ground, at least one electrode in the vicinity of the intercepting point, at least one piezoelectric crystal electrically linked with said electrode and means for compressing the piezoelectric crystal.

According to the invention, the piezoelectric crystal compression means comprise a fixed support on which is mounted the pole in such a way as to be able to pivot about at least one horizontal axis, a bearing member by means of which the pole rests on the support, said bearing member exerting a reaction force or torque in at least certain positions of the pole and means for transmitting said reaction force or torque to the crystal.

The lightning conductor also has means for limiting the pivoting of the pole.

Preferably, the bearing member is convex and can be constituted either by a protuberance located on the pole or the fixed support, or by a ball interposed between the pole and the fixed support.

In certain constructional variants, it is in direct contact with the crystal and itself constitutes the torque transmission means. In other variants, the means for transmitting the torque to the crystal comprise a rigid part in direct contact on the one hand with the bearing member and on the other with the crystal.

In equilibrium, the pole is vertical and rests on the support via the bearing member. The latter exerts a reaction equal to the weight of the pole and said reaction is transmitted to the crystal, which is consequently compressed. However, it is an unstable equilbrium and the pole tends to leave the vertical position under the action of very weak stresses, i.e. in particular under the action of the wind, even when the latter is light. As will be shown hereinafter, in certain embodiments, the bearing member is only in direct or indirect contact with the crystal when the pole is in the vertical position. In other embodiments, the bearing member is permanently in contact with the crystal until, during its pivoting movement, the pole abuts against an element provided on the support. In this case, with the wind continuing to apply a force to the pole, a high force is exerted on the abutment and a high force is exerted by the pole on the bearing member (crowbar principle). The bearing member then exerts a reaction either on the pole, or on the support, and said reaction is transmitted to the crystal, bringing about the compression thereof. Preferably, the crystal is placed in the lower part of the pole.

According to another aspect of the invention, the means for limiting the pivoting of the pole comprise a flange or collar forming part of the support and having a lower face serving as an abutment, a member provided in the lower part of the pole and whereof at least one portion surrounds said flange, said part having a shoulder located at a distanced from the abutment when the pole is vertical and whereof at least one portion can come into contact with the abutment during the pivoting of the pole.

In a particular embodiment, the flange is substantially polygonal, so that the pole pivots in a plane and does not describe a cone. In this case, the flange can have an upper face provided with at least one hole into which can be introduced a pin provided in the lower part of the pole. Thus, the pin prevents the pole from rotating on itself (i.e. about its longitudinal axis). However, if the pin moves out of the hole and if the pole starts to describe a cone, the flat sides of the flange transform said continuous movement into succesive shocks permitting the compressing of the piezoelectric crystals.

According to another feature of the lightning conductor according to the invention, the latter can have a high voltage cable, whereof at least one portion is within the pole, said cable being electrically connected on the one hand to the crystal and on the other to the electrode.

Finally, according to the last aspect of the invention, the electrode is located within a box or casing made from an electricity conducting material and the upper part of said box is pointed, thus constituting the intercepting point. In this case, it is advantageous to have at least one orifice in the lower part of the box and one orifice in the upper part thereof. This arrangement facilitates the circulation of air from bottom to top and aids the transfer of charged particles produced in the vicinity of the electrode towards the upper part of the box, i.e. towards the intercepting point.

BRIEF DESCRIPTION OF THE DRAWINGS

The invention is described in greater detail hereinafter relative to non-limitative embodiments and the attached drawings, wherein:

FIGS. 3a and 3b Diagrams illustrating the operation of the lightning conductor according to the invention in the embodiment of FIG. 2.

DETAILED DESCRIPTION OF THE PREFERRED EMBODIMENTS

Figure 1:
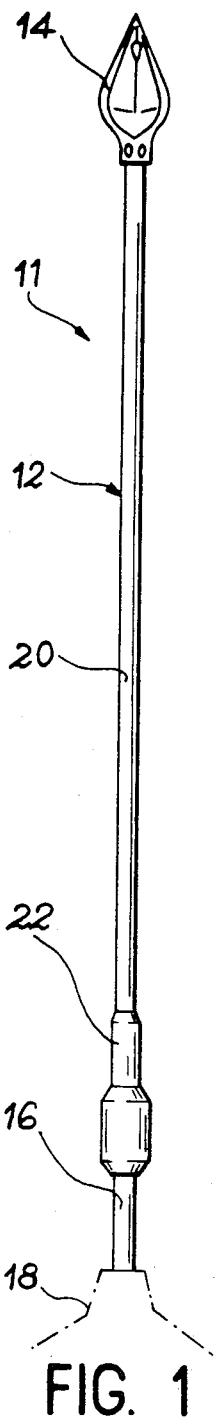
FIG. 1 A diagrammatic view in elevation of the complete lightning conductor according to the invention.

On referring to FIG. 1, it can be seen that the lightning conductor 11 according to the invention comprises a substantially vertical pole or rod 12 terminating in its upper part by a casing or box 14 constituting the intercepting point. The latter will be described in greater detail hereinafter relative to FIG. 6.

According to the invention, pole 12 is mounted in oscillating manner on a support 16, which is fixed in the ground 18. The oscillatory or pivoting movement made possible in this way is a rotary movement about a horizontal axis, generally an axis passing through the lower part of the pole. In the particular case described here, pole 12 comprises a rigid tube 20, in the lower part of which is mounted a connecting member 22. Pole 12 is mounted on support 16 by means of said member 22.

Figure 2:
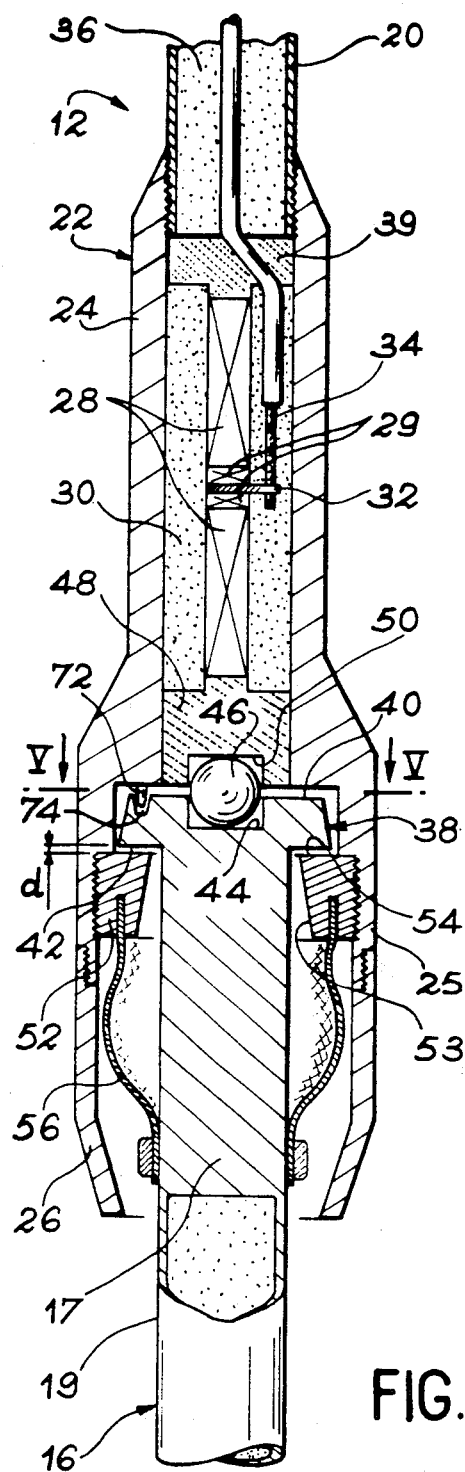
FIG. 2 A diagrammatic larger scale vertical sectional view showing how the pole is mounted on the fixed support in a first variant.

The sectional view of FIG. 2 shows in greater detail the mounting of pole 12 on support 16. It can be seen that the connecting member 22 has an upper substantially cylindrical portion 24 and a lower substantially cylindrical portion 25 and surrounding support 16. Tube 20 is provided in its lower part with an external thread enabling it to be screwed into a tapped hole provided in the upper portion 24 of part 22, but it would not pass outside the scope of the invention to use other fitting means. The interior of portion 24 of part 22 is hollow and contains two piezoelectric crystals 28 separated from the walls of the portion 24 of part 22 by an insulating mass 30. The two crystals 28 are in electrical contact with a metal plate 32 via potential taps 29. The end of a cable 34 is fixed to plate 32. The cable, which can carry high voltage, passes into tube 20 substantially along the axis thereof and can be separated from the inner wall of tube 20 by a centering means 36. Cable 34 makes it possible to electrically connect the piezoelectric crystals 28 to the electrode placed in the upper part of the pole, as will be explained hereinafter.

FIG. 2 also shows that support 16 is substantially shaped like a vertical cylinder and its upper portion is terminated by a flange 38 having a substantially planar. horizontal upper face 40 and a lower face 42, which is also substantially planar and horizontal. In the center of the upper face 40 of flange 38 is provided a slot 44 in which is placed a ball 46. Within the upper portion 24 of connecting part 22 is mounted a rigid part 48, which is in direct contact with one of the piezoelectric crystals 28. Part 48 is provided in its lower portion with a slot 50 having substantially the same shape and dimensions as slot 44 of flange 38 and it is via part 48 resting on ball 46 that the pole rests on support 16. A substantially cylindrical member 52 is screwed into the lower portion 25 of part 22 and is provided in its upper portion with a substantially planar, horizontal bearing face 54 located at a distance d from the lower face 42 of flange 38. Member 52 is centrally provided with a hole 53 permitting the passage of the upper part 17 of support 16. In the embodiment described here, the latter which is terminated by flange 38 is a solid cylindrical mass, whereas the lower part of support 16 is a tube 19, but it would not pass outside the scope of the invention to use other arrangements.

The lighting conductor also has a braid 56 surrounding the upper part 17 of support 16, whereof one end is fixed to the interior of member 52 and is in electrical contact with the latter, whilst its other end is fixed to support 16, so as to be in electrical contact therewith. Tube 20, connecting part 22, member 52 and at least the outer wall of support 16 are made from electricity conducting materials, generally a metal. Thus, the electrical connection between the intersecting point at the top of the pole and the ground is provided by tube 20, part 22, member 52, braid 56 and support 16. It is optionally possible to provide a protective cap 26, which is substantially shaped like a cylindrical sleeve screwed onto the lower portion 25 of part 22 in order to protect braid 56.

The device shown in FIGS. 1 and 2 functions as follows. Fig 2 shows that in the equilibrium position, the pole is vertical and rests on support 16 via part 48 which bears on ball 46. Under the action of the wind or any random stress or force, the pole starts to pivot about a horizontal axis, e.g. an axis perpendicular to the plane of the drawing. In this case, the pole oscillates in the plane of the drawing until the upper face 54 of member 52 abuts against the lower face 42 of flange 38. As the wind continues to exert a force on the pole, this increases the rotary torque exerted on the latter. However, as the latter is unable to continue its movement due to the fact that member 52 abuts against face 42 of flange 38, this has the effect of the pole exerting a significant effect on ball 46 via member 48. Thus, there is a reaction transmitted from support 16 to member 48 via ball 46 and from member 48 to piezoelectric crystals 28. The latter are immobilized within part 22 by an abutment 39 provided in the upper portion thereof, immediately below tube 20. As they are unable to slide along the longitidinal axis of part 22, they are compressed. They are then the origin of an electrical potential, which is transmitted to the electrode located in the upper part of the pole via cable 34.

It is pointed out that in the embodiment illustrated in FIG. 2, the piezoelectric crystals 28 are constantly compressed, even when the pole is not in abutment and is located in the neutral position (vertical position) or in the vicinity thereof. Thus, the arrangement of the different elements is such that member 48 is constantly in contact with ball 46 and there is always a reaction force due to the weight of the pole.

The operating principle of the lighting conductor shown in FIG. 2 will now be described in greater detail relative to FIGS. 3a and 3b. The latter show very diagrammatically pole 12 with, in its lower part, part 22 by means of which it rests on support 16. The latter carries flange 38, which has a lower face 42. It is also possible to see in FIGS. 3a and 3b that part 22 is provided in its lower portion with a planar surface 54 having the same function as the upper face 54 of member 52 of FIG. 2. The upper end 47 of support 16 is convex and has the same function as ball 46 (thus, the bearing member can be a ball or a protuberance provided either on the support, or in the lower part of the pole). The contact point between pole 12 and the upper portion 47 of support 16 is designated 58 and the pole rotates about all the horizontal axes passing through point 58. L is the length of the pole from its top to the rotation axis and L is the distance between the axis of support 16 and the edge of flange 38 (pole 12 and support 16 are preferably constructed in such a way that they have an axis of symmetry of revolution).

The lightning conductor functions as follows. FIG. 3a shows the assembly in the equilibrium position, i.e. with the pole vertical. Under the action of a random force, the pole starts to oscillate about its horizontal axis, e.g. an axis perpendicular to the plane of the drawing and passing through point 58. Thus, the pole arrives in the position of FIG. 3b, where it is inclined to the right on considering the drawing, whereas face 54 of part 22 is in contact with the lower face 42 of flange 38 at point 59. The movement of the pole is consequently blocked and, if it continues to be exposed to the same force (e.g. the action of the wind), it is subject to a rotary torque which can be likened to a force F1 applied to its upper part. There follows a reaction force F2 exerted by flange 38 on face 54 at point 59 and a reaction force F3 exerted by the upper part 47 of support 16 on pole 12. The intensity of force F3 is defined by the formula:

$$F3 = \rho \frac{L}{l} \times F1$$

being the mechanical efficiency of the system.

As distance L is very large compared with distance l, force F3 greatly exceeds force F1. It is force F3 which is transmitted to the piezoelectric crystals (via member 48 in the embodiment of FIG. 2) and, as the crystals are immobilized within the pole, they are subject to compression. They are the origin of a high voltage transmitted to the electrode located in the upper part of the pole.

Figure 4:
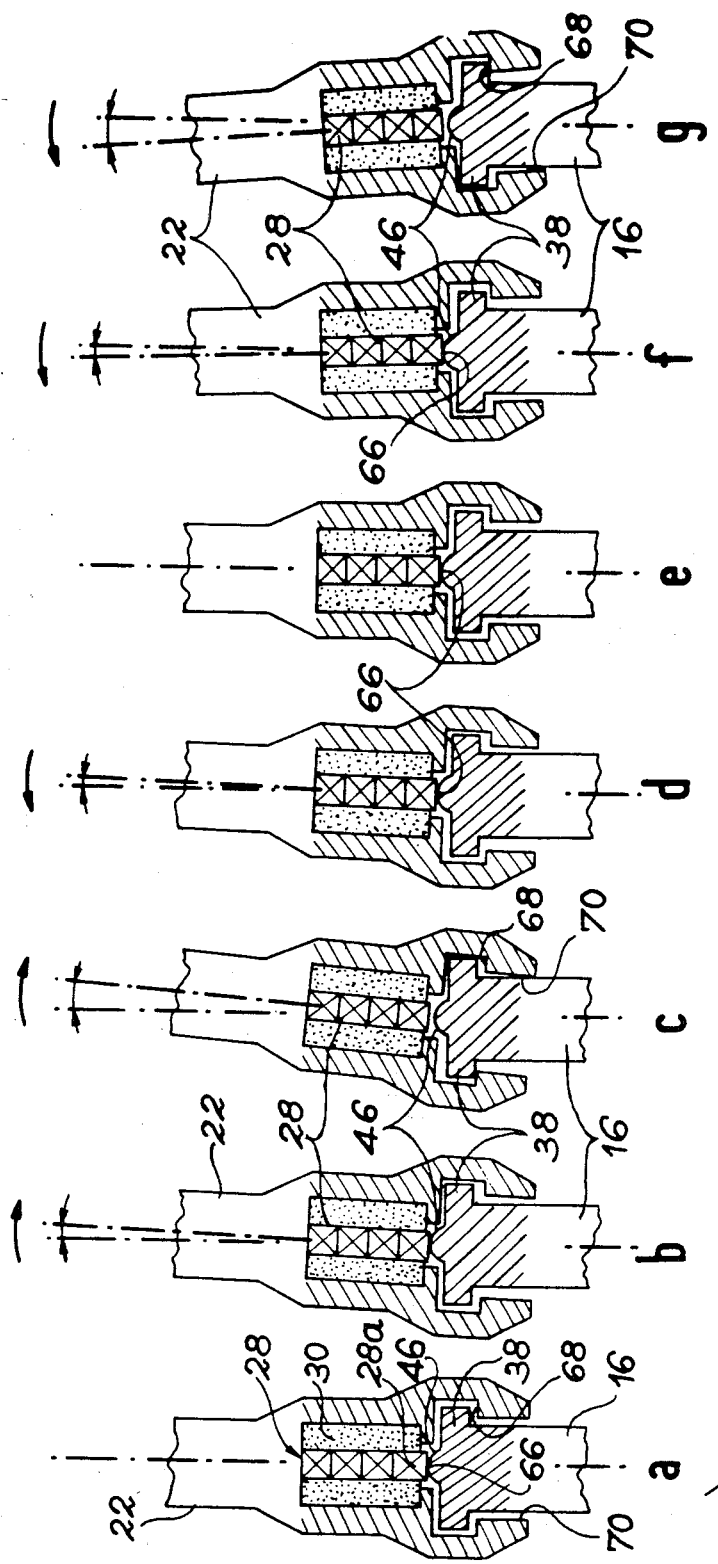
FIG. 4 A view illustrating by stages a to g the operation of the lightning conductor according to the invention in another variant.

FIGS. 4a to 4g illustrate the operation of the device in a different embodiment. FIG. 4a shows the connecting part 22 containing a stack of piezoelectric crystals 28 held by an insulator 30 within part 22. However, ball 46 is replaced by a protuberance or boss 66 located substantially in the center of flange 38 of support 16. The piezoelectric crystal 28a located at the lower end of the stack resets directly on boss 66 when the device is in equilibrium (i.e. when the pole is vertical). The lower part of part 22 has a shoulder 68 which can abut against the lower face of flange 38. In its lower portion, part 22 has a cylindrical hole 70 surrounding support 16 below flange 38.

When the wind blows, e.g. from left to right in FIG. 4a, the pole starts to oscillate in the plane of the drawing about an axis perpendicular to the plane thereof. At the start of this movement (FIG. 4b), the lower crystal 28a remains in contact with boss 66 of flange 38. With the movement continuing in the same direction, the position of FIG. 4c is obtained, where shoulder 68 of part 22 abuts against the lower face of flange 38 at a point whereas, in a diametrically opposite position, the wall of hole 70 is in contact with the upper portion of support 16. It should be noted that the stress exerted on the piezoelectric ceramics progressively decreases during this movement until crystal 28a is no longer in contact with boss 66. Movement is limited by the contact of the wall of hole 70 with support 16 and of shoulder 68 on the lower face of flange 38. On arriving in the position of FIG. 4c, by elasticity, the assembly moves back to the left when viewing the drawing and again passes through the position of FIGS. 4d and 4e, which are the same as those of FIGS. 4b and 4a respectively. The movement continues to the left and one passes through position shown in FIGS. 4f and 4g, which are similar to those of FIGS. 4b and 4c respectively, the pole being on this occasion inclined towards the left instead of the right.

Figure 5:
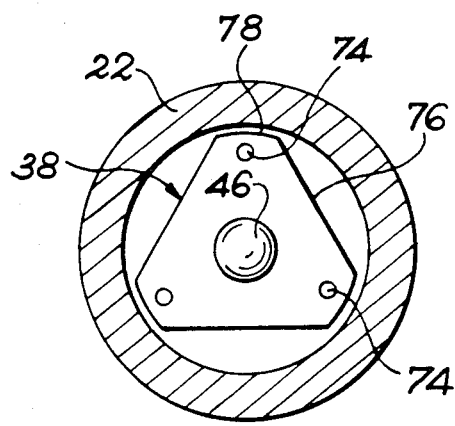
FIG. 5 A diagrammatic sectional view along line V—V of FIG. 2. when the flange of the fixed support is polygonal.

On again referring to FIG. 2, it is possible to see that there is a pin 72 on connecting part 22, which can penetrate holes such as 74 provided in the upper face 40 of flange 38. The function of pin 72 and of hole 74 will now be described with reference to FIGS. 2 and 5. It is possible to see in the sectional view of FIG. 5 that flange 38 can have a substantially polygonal shape and be e.g. in the form of a triangle. The latter is constituted by planar faces 76 connected by curved portions 78. It is at the apices of the triangle, i.e in the vicinity of the curved portion 78 that the holes 74 are located. On referring to FIG. 2. it can be seen that if the wind forces the pole from the right to the left on considering the drawing, pin 72 penetrates hole 74. Thus. it prevents the pole from turning on itself. i.e. about its own longitudinal axis. However, the relative dimensions of pin 72 and hole 74 are such that the oscillatory movement is not disturbed or stopped before member 52 abuts against the lower face of flange 38.

Figure 6:
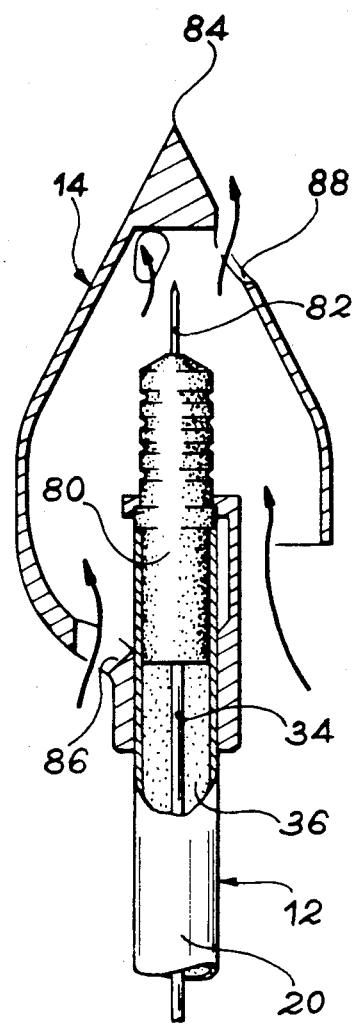
FIG. 6 A diagrammatic larger scale vertical sectional view of the upper part of the lightning conductor of FIG. 1.

It is also possible that for some reason or the other the pole leaves its abutment position and starts to turn about its own neutral position, i.e. describes a cone instead of oscillating in a plane. In this case, as a result of the shape of the flange, the movement is not continuous and the part 22 undergoes successive shocks against flange 38. These shocks make it possible to compressively stress the piezoelectric crystals and the latter continue to play their part. The sectional view of FIG. 6 illustrates in greater detail the upper part of pole 12, where the box 14 constituting the intercepting point is located. It is once again possible to see tube 20 within which is located the high voltage cable 34 held by centering means 36. A support 80 is mounted in the upper part of tube 20 and carries at its upper end a pointed metal rod 82 constituting the electrode, whereby the latter is in electrical contact with cable 34. Box 14 is hollow and forms a recess containing the upper part of tube 20, support 80 and rod 82. In its upper part, box 14 terminates in the form of a point and constitutes the intercepting point 84 of the lightning conductor. In its lower part, box 14 is in electrical contact with tube 20. As it is made from an electricity conducting material, point 84 is connected electrically to the ground via tube 20, as stated hereinbefore. FIG. 6 also shows that box 14 is provided in its lower part with openings such as 86 and in its upper part with openings such as 88. The latter permit a bottom to top air circulation, i.e. from orifices 86 to orifices 88, as indicated by the arrows in FIG. 6. The effect of this circulation of air is to facilitate the transfer of the electrons produced at electrode 82 up to the intercepting point 84.

The lightning conductor according to the invention has particularly interesting advantages because it functions alone, without the aid of external equipment. It is merely necessary to have a very light wind or a very limited stress to ensure that the pole oscillates. It is pointed out that the equilibrium position in which the pole is precisely vertical corresponds to an unstable equilibrium. Thus, a random stress, even of a very weak nature and in the absence of wind, brings about the oscillatory movement of the pole and consequently the lightning conductor is substantially permanently in operation. Thus, it is virtually impossible for the pole to remain constantly in the vertical position. As it is an unstable equilibrium, it can leave this equilibrium position under the effect of very weak stresses and attain an abutment position where the ceramics are compressed. It may possibly remain a certain time in this position but, as a result of the elasticity of the device. It can return in the reverse direction and again pass through the equilibrium position before reaching a new abutment position. This is particularly interesting for the variant illustrated in FIG. 4, in which the piezoelectric crystals are only compressed in the vicinity of the vertical position. Finally, in the variant illustrated in FIG. 5 where the flange is substantially polygonal, the system functions even if the pole rotates about its equilibrium position, i.e. describes a cone instead of oscillating in a plane.

It is obvious that the invention is not limited to the embodiments described and numerous variants are possible thereto without passing beyond the scope of the invention. Thus, as a function of the particular case, it is possible to vary the number and arrangement of the piezoelectric crystals, means for maintaining them within the device, or the shape and location of the bearing member. Finally, although the invention essentially applies to lightning conductors, it can also be used for other cases where it is wished to produce a high voltage by compressing piezoelectric crystals.

What is claimed is:

1. A lightning conductor comprising a substantially vertical pole, an intercepting point located in the upper part of the pole and electrically connected to the ground, at least one electrode in the vicinity of the intercepting point, at least one piezoelectric crystal electrically connected to said electrode and means for compressing the piezoelectric crystal, wherein the compressing means comprise a fixed support on which the pole is mounted so as to be able to pivot about at least one horizontal axis, a bearing member by means of which the pole rests on the support, said bearing member exerting a reaction force at least in certain pole positions and means for transmitting said reaction force to the crystal, the lightning conductor also having means for limiting the pivoting movement of the pole.

2. A lightning conductor according to claim 1, wherein the bearing member is a convex member.

3. A lightning conductor according to claim 2, wherein the bearing member is a protuberance on the pole.

4. A lightning conductor according to claim 2, wherein the bearing member is a protuberance provided on the fixed support.

5. A lightning conductor according to claim 2, wherein the bearing member is a ball interposed between the pole and the fixed support.

6. A lightning conductor according to claim 1, wherein the bearing member is in direct contact with the crystal, which itself forms the reaction force transmission means.

7. A lightning conductor according to claim 1, wherein the means for transmitting the reaction force to the crystal comprise a rigid part in direct contact on the one hand with the bearing member and on the other with the crystal.

8. A lightning conductor according to claim 1, wherein the crystal is placed in the lower part of the pole.

9. A lightning conductor according to claim 1, wherein the means for limiting the pivoting movement of the pole comprise a flange forming part of the support and having a lower face serving as an abutment and a part provided in the lower portion of the pole and whereof at least one portion surrounds the flange, said part having a shoulder located at a selected distance from the abutment when the pole is vertical and whereof at least one portion can come into contact with the abutment during the pivoting of the pole.

10. A lightning conductor according to claim 9, wherein the flange is polygonal.

11. A lightning conductor according to claim 10, wherein the flange has an upper face with at least one hole, in which is introduced a pin mounted in the lower part of the pole.

12. A lightning conductor according to claim 1, wherein it incorporates a high voltage cable, whereof at least part is located within the pole, said cable being electrically connected on the one hand to the crystal and on the other to the electrode.

13. A lightning conductor according to claim 1, wherein the electrode is located within a box made from a material which conducts electricity and whereof the upper part terminates in a point, thus forming the intercepting point.

14. A lightning conductor according to claim 13, wherein the box has at least one orifice in its lower part and at least one orifice in its upper part.

* * * * *